US009163844B2

(12) United States Patent
Tangney

(10) Patent No.: US 9,163,844 B2
(45) Date of Patent: Oct. 20, 2015

(54) APPARATUS AND A SYSTEM FOR CONTROLLING TEMPERATURE IN A PLURALITY OF ZONES IN A BUILDING

(76) Inventor: James Gerard Tangney, Passage West (IE)

(*) Notice: Subject to any disclaimer, the term of this patent is extended or adjusted under 35 U.S.C. 154(b) by 1089 days.

(21) Appl. No.: 13/054,035

(22) PCT Filed: Jul. 16, 2009

(86) PCT No.: PCT/IE2009/000048
§ 371 (c)(1),
(2), (4) Date: Apr. 11, 2011

(87) PCT Pub. No.: WO2010/007606
PCT Pub. Date: Jan. 21, 2010

(65) Prior Publication Data
US 2011/0174475 A1    Jul. 21, 2011

(30) Foreign Application Priority Data
Jul. 16, 2008  (IE) .................................. S2008/0589

(51) Int. Cl.
*F24F 3/00*  (2006.01)
*F24F 3/044*  (2006.01)
*G05D 23/19*  (2006.01)

(52) U.S. Cl.
CPC ............ *F24F 3/044* (2013.01); *G05D 23/1934* (2013.01)

(58) Field of Classification Search
CPC ........................... F28F 2003/0448; F28F 3/044
USPC ......................................... 165/205, 208, 212
See application file for complete search history.

(56) References Cited

U.S. PATENT DOCUMENTS 2,254,185 A * 8/1941 Newton ......................... 165/216
2,806,675 A * 9/1957 Conradi ........................... 165/50
(Continued)

OTHER PUBLICATIONS

International Search Report for PCT/IE2009/000048—mailing date Mar. 18, 2010.

*Primary Examiner* — Marc Norman
*Assistant Examiner* — Devon Russell
(74) *Attorney, Agent, or Firm* — Sughrue Mion, PLLC

(57) ABSTRACT

A system (1) for controlling the temperature of two zones or rooms (2) of a building comprises apparatus (5) which comprises a housing (9) within which an impeller (12) draws return air from the two rooms (2) through respective small bore return ducts (8) and inlet ports (14) into a common inlet chamber (22). A two zone heat exchanger (20) located in the 43 housing (10) downstream of the impeller (12) defines two mutually isolated flow air heat exchange paths (26) between the impeller (12) and respective outlet ports (15) through which flow air is delivered to the respective rooms (2) through small bore flow ducts (7). Two mutually isolated flow air bypass paths (28) corresponding to the flow air heat exchange paths (26) also communicate the impeller (12) with the respective outlet ports (15). Two corresponding primary air flaps (29) are selectively operable in first and second states for directing flow air from the impeller (12) through one of the corresponding flow air heat exchange and bypass paths (26) and (28), respectively, of the corresponding outlet ports (15). A microcontroller (50) is provided for selectively operating the primary air flaps (29) between the first and second states in response to temperature read from temperature sensors (37) located in the inlet ports (14) for detecting the temperature of the return air. A boiler (40a) is provided for providing heated heat exchange water to the heat exchanger (20).

20 Claims, 7 Drawing Sheets

(56) References Cited

U.S. PATENT DOCUMENTS

Figure 1:
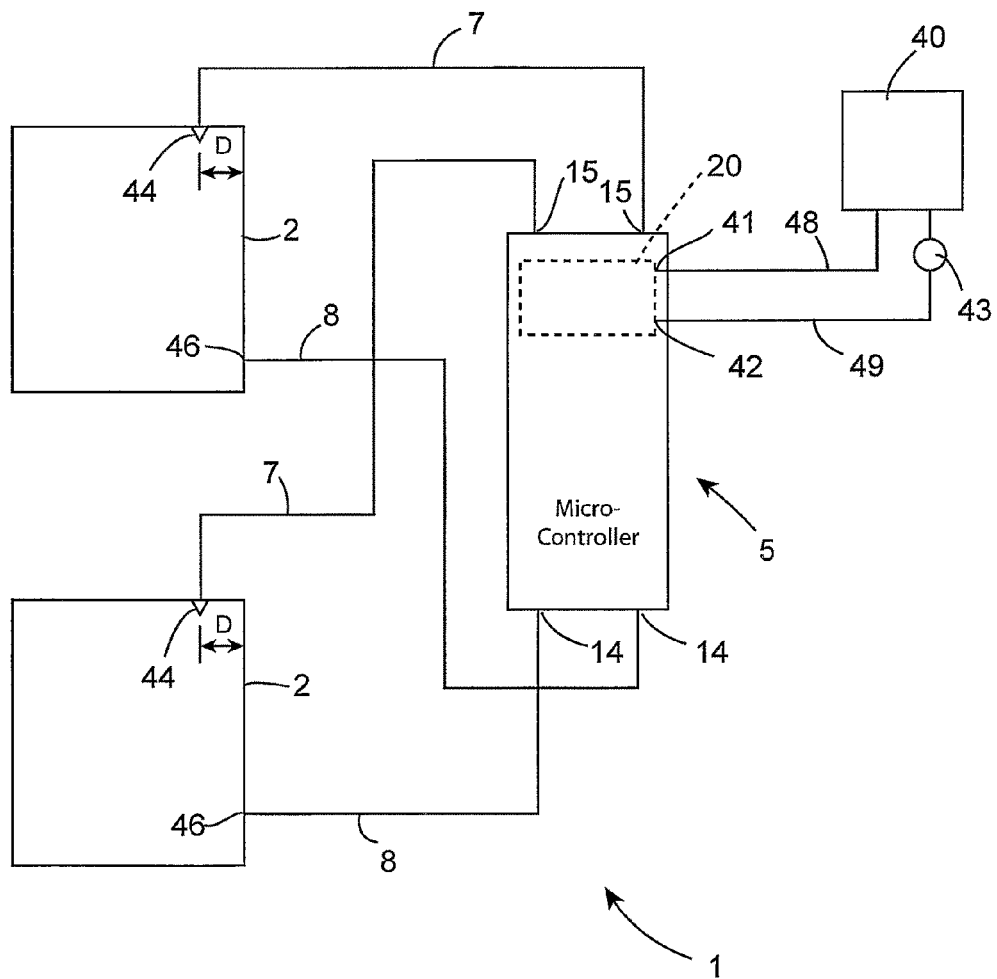

| | | | |
|---|---|---|---|
| 3,635,245 A * | 1/1972 | Canfield | 137/607 |
| 3,847,210 A * | 11/1974 | Wells | 165/103 |
| 3,994,335 A * | 11/1976 | Perkins | 165/103 |
| 4,312,381 A * | 1/1982 | Ratner | 137/636 |
| 4,531,573 A * | 7/1985 | Clark et al. | 165/216 |
| 4,732,318 A | 3/1988 | Osheroff | |
| 4,754,919 A | 7/1988 | Otsuka | |
| 5,086,692 A * | 2/1992 | Welch et al. | 454/187 |
| 5,117,899 A * | 6/1992 | Skimehorn | 165/48.1 |
| 5,931,227 A * | 8/1999 | Graves | 165/216 |
| RE44,146 E * | 4/2013 | Bagwell et al. | 236/49.3 |
| 2003/0142121 A1* | 7/2003 | Rosen | 345/702 |
| 2005/0186901 A1* | 8/2005 | Moore | 454/292 |
| 2008/0182506 A1* | 7/2008 | Jackson et al. | 454/354 |
| 2009/0188329 A1* | 7/2009 | Mangiapane et al. | 73/861.63 |
| 2009/0264062 A1* | 10/2009 | Miller et al. | 454/237 |

\* cited by examiner

APPARATUS AND A SYSTEM FOR CONTROLLING TEMPERATURE IN A PLURALITY OF ZONES IN A BUILDING

The present invention relates to apparatus for controlling the temperature in a plurality of zones of a building, for example, rooms or zones of a domestic dwelling, and the invention also relates to a system and a method for controlling the temperature in a plurality of zones in a building, for example, a zone of a building may include one or more rooms.

Various heating systems are known for heating zones in a building, for example, rooms in a domestic dwelling. One system which is commonly referred to as a central heating system comprises installing water filled radiators in the respective rooms of the building and pumping heated water through the radiators from a boiler. Another system requires ducting heated air through a system of ducts from a heat source or an air conditioning unit to the respective rooms. However, both systems namely, the central heating system and the air ducting system tend to be relatively expensive and cumbersome to install. The central heating system requires running flow and return pipes from a boiler to respective radiators in the respective rooms. The running of flow and return pipes between a boiler and the respective radiators is relatively time consuming and expensive. Additionally, the cost of the radiators is also relatively high. A further problem with such central heating systems is that they are relatively expensive to retrofit into an existing building. Indeed, a serious problem associated with such central heating systems is that, in general, no effective capacity and temperature control systems exist, which are suitable for operating such central heating systems with capacity and temperature adequately controlled.

Conventional air duct systems, in general, are unsuitable for domestic dwellings due to the relatively large size of the air ducts required to accommodate sufficient volumes of air to the respective rooms. And where installed, tend to be unsightly, and are also expensive to install and to operate. A further problem associated with such conventional air duct systems is that they tend to transmit noise to the rooms or zones of a building in which the temperature is being controlled. The transmission of dust is also a problem with such known conventional air duct systems. Additionally, in general, conventional air duct systems preclude any form of effective capacity and temperature control.

There is therefore a need for a system for controlling the temperature of a plurality of zones in a building which addresses at least some of the problems of known central heating and air ducting systems, and there is also a need for apparatus and a method for controlling the temperature of a plurality of zones in a building, which similarly addresses at least some of the problems of known methods.

The present invention is directed towards providing such an apparatus, a system and a method.

According to the invention there is provided apparatus for controlling temperature in a plurality of zones in a building, the apparatus comprising a heat exchange means, a plurality of mutually isolated heat exchange paths extending through the heat exchange means and terminating in respective outlet ports for accommodating flow air therethrough for delivery to the respective zones, a plurality of mutually isolated bypass paths corresponding to the respective heat exchange paths and terminating in the respective outlet ports for accommodating the flow air to bypass the corresponding respective heat exchange paths to the corresponding respective outlet ports, a plurality of inlet ports for accommodating return air therethrough returned from the respective zones, a plurality of return air temperature sensing means for sensing the temperature of the return air from the respective zones, a plurality of primary valve means corresponding to the respective heat exchange paths, each primary valve means being selectively operable in response to the temperature of return air from the corresponding one of the respective zones in one of a first state for directing the flow air through the corresponding heat exchange path and a second state for directing the flow air through the corresponding bypass path, and an air circulating means for circulating air through the apparatus from the inlet ports to the outlet ports thereof.

Preferably, the inlet ports are located upstream of the air circulating means. Advantageously, the outlet ports are located downstream of the air circulating means. Ideally, the heat exchange means is located between the air circulating means and the outlet ports.

Preferably, the air circulating means is adapted for circulating the air through the apparatus so that the flow air exiting the outlet ports is suitable for passing through respective small bore ducts at a relatively high velocity. Preferably, the air circulating means is adapted for circulating the air through the apparatus so that the flow air passing through the outlet ports is suitable for delivery through respective small bore ducts of transverse cross-sectional diameter of not less than 50 mm. Advantageously, the air circulating means is adapted for circulating the air through the apparatus so that the flow air passing through the outlet ports is suitable for delivery through respective small bore ducts of transverse cross-sectional diameter in the range of 50 mm to 100 mm. Ideally, the air circulating means is adapted for circulating the air through the apparatus so that the flow air passing through the outlet ports is suitable for delivery through respective small bore ducts of transverse cross-sectional diameter of approximately 50 mm.

Preferably, the air circulating means is adapted for circulating the air through the apparatus so that the flow air exiting the outlet ports is suitable for delivery through the respective flow ducts at a velocity in the range of 5M per second to 10M per second. Advantageously, the air circulating means is adapted for circulating the air through the apparatus so that the flow air exiting the outlet ports is suitable for delivery through the respective flow ducts at a velocity in the range of 6M per second to 10M per second. Ideally, the air circulating means is adapted for circulating the air through the apparatus so that the flow air exiting the outlet ports is suitable for delivery through the respective flow ducts at a velocity of approximately 9M per second.

Preferably, the air circulating means is adapted for circulating the air through the apparatus so that the flow air exiting the respective outlet ports exits at a rate in the range of $0.7M^3$ per minute to $1.0M^3$ per minute. Advantageously, the air circulating means is adapted for circulating the air through the apparatus so that the flow air exiting the respective outlet ports exits at a rate of approximately $0.9M^3$ per minute.

In one aspect of the invention a fresh air inlet port is provided for accommodating fresh air into the apparatus for mixing with the return air. Preferably, the fresh air inlet port is located upstream of the circulating means. Advantageously, a fresh air control valve means is provided for selectively controlling the supply of fresh air through the fresh air inlet port in response to the temperature sensing means. Advantageously, the fresh air control valve means is located downstream of the fresh air inlet port. Ideally, the fresh air control valve means is selectively operable in one of a communicating state communicating the fresh air inlet port with the air circulating means, and an isolating state isolating the fresh air inlet port from the air circulating means.

In another aspect of the invention a plurality of secondary valve means is provided corresponding to the respective inlet ports, each secondary valve means being selectively operable in one of a communicating state for communicating the air circulating means with the corresponding inlet port and an isolating state for isolating the air circulating means from the corresponding inlet port. Preferably, each secondary valve means is located downstream of the corresponding inlet port.

Preferably, each temperature sensing means is located adjacent a corresponding one of the inlet ports. Advantageously, the temperature sensing means are located downstream of the respective inlet ports.

In one aspect of the invention the heat exchange means is adapted for coupling to an energy source. Preferably, the heat exchange means is adapted for coupling to an energy source provided by one of heat source and a cooling source. Advantageously, the heat exchange means is adapted to be selectively coupled to the one of the heat source and the cooling source. Ideally, the heat exchange means is adapted for receiving energy from the energy source via a heat exchange medium. Preferably, the heat exchange means is adapted for receiving energy via water acting as the heat exchange medium.

In another aspect of the invention a control means is provided for controlling the operation of the primary valve means in response to the temperature of the return air from the respective zones. Preferably, an input means is provided to the control means for facilitating inputting of respective temperature set point values indicative of the temperatures at which the air in the respective zones is to be maintained. Advantageously, the control means comprises a comparing means for comparing the temperature of the return air from the respective zones with the corresponding temperature set point values thereof.

Preferably, the control means is responsive to the temperature of the return air from each zone differing by a first predefined amount greater than the temperature set point value of the corresponding zone and by a predefined second amount less than the temperature set point value of the corresponding zone for operating the primary valve means corresponding to the zone for directing the flow air through an appropriate one of the heat exchange path and the bypass path corresponding to the zone.

In another aspect of the invention the control means is responsive to the respective primary valve means being continuously operated in the second state for a first predefined time period for outputting a signal to isolate the heat exchange means from the energy source. Preferably, the control means is responsive to the respective primary valve means being continuously operated in the second state for a second predefined time period for operating the air circulating means at a low level speed for a third predefined time period to minimise energy consumption.

In one aspect of the invention the third predefined time period lies in the range of 2 minutes to 12 minutes. Preferably, the third predefined time period lies in the range of 3 minutes to 10 minutes. Advantageously, the third predefined time period is approximately 5 minutes.

In another aspect of the invention the second predefined time period lies in the range of 5 minutes to 15 minutes. Preferably, the second predefined time period is approximately 10 minutes.

In a further aspect of the invention the first predefined time period lies in the range of 2 minutes to 10 minutes. Preferably, the first predefined time period is approximately 5 minutes.

In one embodiment of the invention each primary valve means is adapted to transition between the first state and the second state at a relatively slow rate. Preferably, the time taken by each primary valve means to transition between the first state and the second state lies in the range of 5 seconds to 30 seconds. Advantageously, the time taken by each primary valve means to transition between the first state and the second state lies in the range of 7 seconds to 20 seconds. Ideally, the time taken by each primary valve means to transition between the first state and the second state is approximately 10 seconds.

Preferably, each primary valve means is operated to transition between the first state and the second state by a pulse width modulated signal.

Advantageously, the air circulating means comprises a backward curved impeller. Ideally, the impeller of the air circulating means is driven by an electronically commutated DC motor.

In another embodiment of the invention a filter means is provided for filtering return air. Preferably, the filter means is provided downstream of the inlet ports. Advantageously, the filter means is located upstream of the air circulating means.

In a further embodiment of the invention the apparatus comprises a housing defining a hollow interior region, the hollow interior region of the housing forming an impeller chamber for housing the air circulating means, a common inlet chamber communicating with the impeller chamber and the inlet ports within which return air from the respective zones is mixed, and a heat exchange chamber for accommodating the heat exchange means downstream of the impeller chamber and communicating therewith, the heat exchange chamber communicating with the outlet ports.

Preferably, the primary valve means are located in the hollow interior region between the impeller chamber and the heat exchange chamber. Advantageously, the secondary valve means are located within the hollow interior region adjacent the corresponding inlet ports. Ideally, the fresh air control valve means is located in the hollow interior region between the fresh air inlet port and the air circulating means.

In one aspect of the invention the temperature sensing means are located within the hollow interior region adjacent the inlet ports.

Preferably, the control means is located in the housing.

In another embodiment of the invention each primary valve means comprises a primary air flap. Preferably, each primary air flap is operated between the first state and the second state by a corresponding servo-motor under the control of the control means.

In another embodiment of the invention each secondary valve means comprises a secondary air flap. Preferably, each secondary air flap is operable between the communicating state and the isolating state by a corresponding servo-motor under the control of the control means.

In a further embodiment of the invention the fresh air control valve means comprises a fresh air control flap. Preferably, the fresh air control flap is operated for controlling the supply of fresh air through the fresh air inlet port by a servo-motor under the control of the control means.

The invention also provides a system for controlling temperature in a plurality of respective zones in a building, the system comprising the apparatus according to the invention for controlling the temperature in the plurality of the respective zones, and a plurality of flow ducts extending from the respective outlet ports to the respective zones for delivering flow air to the respective zones, and a plurality of return ducts extending from the respective inlet ports to the respective zones for accommodating return air from the zones to the respective inlet ports.

The invention further provides a system for controlling temperature in a plurality of respective zones in a building, the system comprising apparatus for controlling the temperature in the zones, the apparatus comprising a heat exchange means, a plurality of mutually isolated heat exchange paths extending through the heat exchange means and terminating in respective outlet ports from the apparatus for accommodating flow air therethrough for delivery to the respective zones, a plurality of mutually isolated bypass paths corresponding to the respective heat exchange paths and terminating in the respective outlet ports for accommodating the flow air to bypass the corresponding respective heat exchange paths to the corresponding respective outlet ports, a plurality of inlet ports to the apparatus for accommodating return air from the respective zones, a plurality of return air temperature sensing means for sensing the temperature of the return air from the respective zones, a plurality of primary valve means corresponding to the respective heat exchange paths, each primary valve means being selectively operable in response to the temperature of return air from the corresponding one of the respective zones in one of a first state for directing the flow air through the corresponding heat exchange path and a second state for directing the flow air through the corresponding bypass path, and an air circulating means for circulating air through the apparatus from the inlet ports to the outlet ports thereof, a plurality of flow ducts communicating the outlet ports with the respective zones and a plurality of return ducts communicating the inlet ports with the respective zones.

In one embodiment of the invention each flow duct terminates at its downstream end in a venturi nozzle. Preferably, each venturi nozzle defines an outlet orifice for accommodating the flow air therethrough, the transverse cross-sectional area of the orifice being at least 1900 mm$^2$. Advantageously, each venturi nozzle defines an outlet orifice for accommodating the flow air therethrough, the transverse cross-sectional area of the orifice being approximately 2000 mm$^2$. Ideally, the orifice defined by each venturi nozzle is circular.

In one aspect of the invention each venturi nozzle is adapted for locating in a ceiling of the corresponding zone for directing the flow air downwardly into the zone. Preferably, each venturi nozzle is adapted for mounting in the ceiling of the corresponding zone spaced apart from an adjacent wall of the zone a distance in the range of 100 mm to 250 mm. Advantageously, each nozzle is adapted for mounting in the ceiling of the corresponding zone spaced apart from an adjacent wall of the zone a distance in the range of 150 mm to 200 mm.

In another embodiment of the invention each return duct comprises an inlet adapted for receiving return air at a level in the zone lower than the level at which the flow air is delivered into the zone.

In another embodiment of the invention each flow duct is a small bore duct. Preferably, each flow duct is of diameter of not less than 50 mm. Advantageously, each flow duct is of diameter in the range of 50 mm to 100 mm. Ideally, each flow duct is of diameter of approximately 50 mm.

In a further embodiment of the invention each return duct is a small bore duct. Preferably, each return duct is of diameter of not less than 50 mm. Advantageously, each return duct is of diameter in the range of 50 mm to 100 mm. Ideally, each return duct is of diameter of approximately 50 mm.

Preferably, each flow duct is of circular transverse cross-section, and advantageously, each return duct is of circular transverse cross-section.

In another aspect of the invention an energy source is provided, the energy source being coupled to the heat exchange means for providing one of heating and cooling to the heat exchange means. Preferably, the energy source comprises one of a heat source and a cooling source. Advantageously, the heat exchange means is selectively coupleable to the one of the heat source and the cooling source. Preferably, the heat exchange means is adapted for receiving heating or cooling energy from the energy source via a heat exchange medium. Advantageously, the heat exchange means is adapted for receiving heating or cooling energy via water acting as the heat exchange medium.

Additionally the invention provides a method for controlling the temperature in a plurality of respective zones in a building, the method comprising providing apparatus for controlling the temperature in the respective zones, providing the apparatus with a heat exchange means, providing a plurality of mutually isolated heat exchange paths extending through the heat exchange means and terminating in respective outlet ports in the apparatus for accommodating flow air therethrough for delivery to the respective zones, providing a plurality of mutually isolated bypass paths corresponding to the respective heat exchange paths terminating in the respective outlet ports for accommodating the flow air to bypass the corresponding respective heat exchange paths to the corresponding respective outlet ports, providing a plurality of inlet ports in the apparatus for accommodating return air from the respective zones to the apparatus, providing a plurality of return air temperature sensing means for sensing the temperature of the return air from the respective zones, providing a plurality of primary valve means corresponding to the respective heat exchange paths, each primary valve means being selectively operable in response to the temperature of return air from the corresponding one of the respective zones in a first state for directing the flow air through the corresponding heat exchange path and in a second state for directing the flow air through the corresponding bypass path, and providing an air circulating means for circulating air through the apparatus from the inlet ports to the outlet ports thereof, providing a plurality of flow ducts extending between the respective outlet ports and the respective corresponding zones, and providing a plurality of return ducts extending between the respective inlet ports and the respective corresponding zones, the method further comprising operating the air circulating means to circulate air through the apparatus to and from the respective zones, and operating each primary valve means in response to the temperature of the return air from the corresponding zone to direct the flow air through one of the heat exchange path and the bypass path corresponding to the zone for maintaining the temperature in the respective zones at respective desired temperatures.

Figure 2:
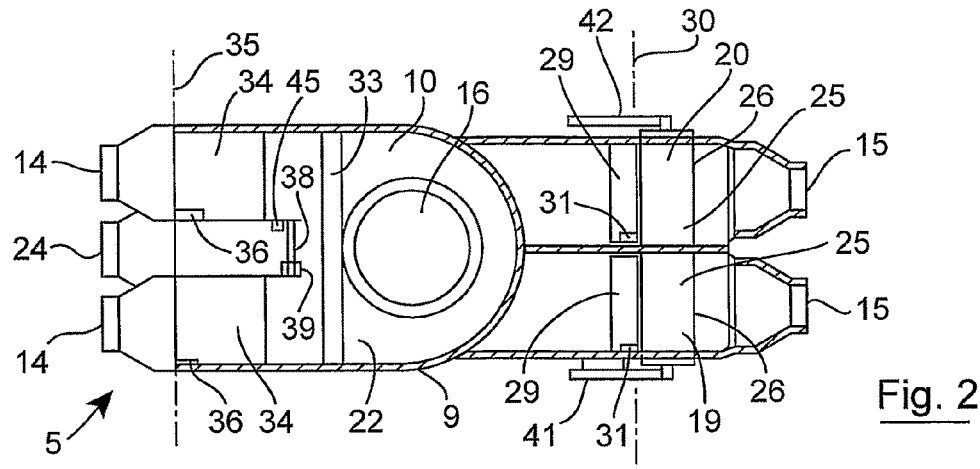
Figure 3:
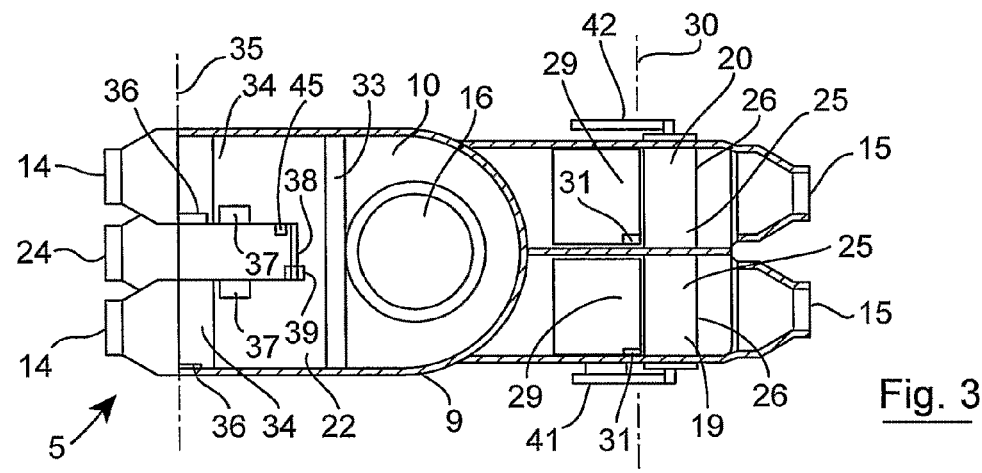
Figure 4:
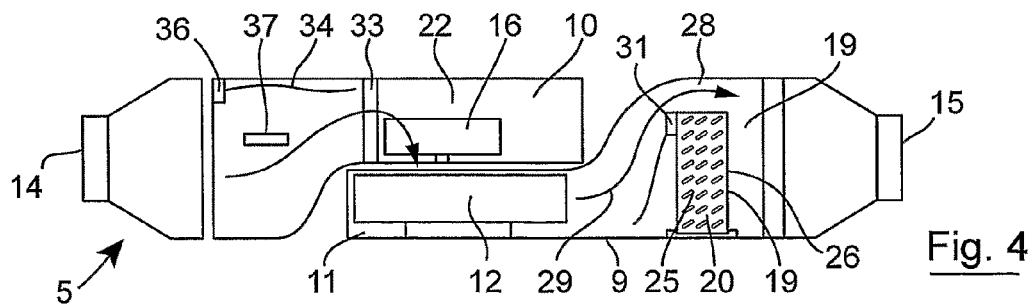
Figure 5:
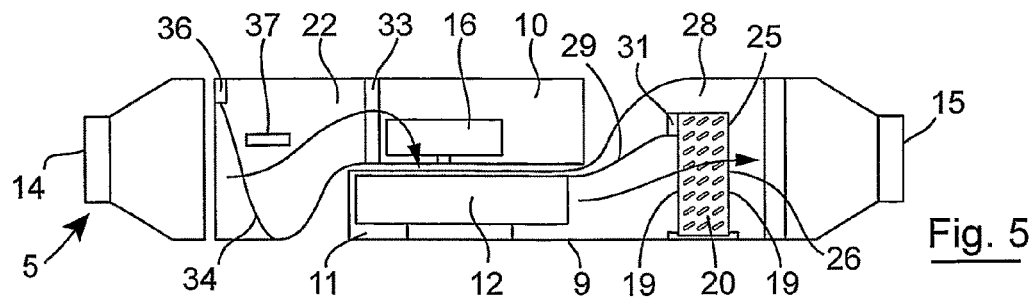
Figure 6:
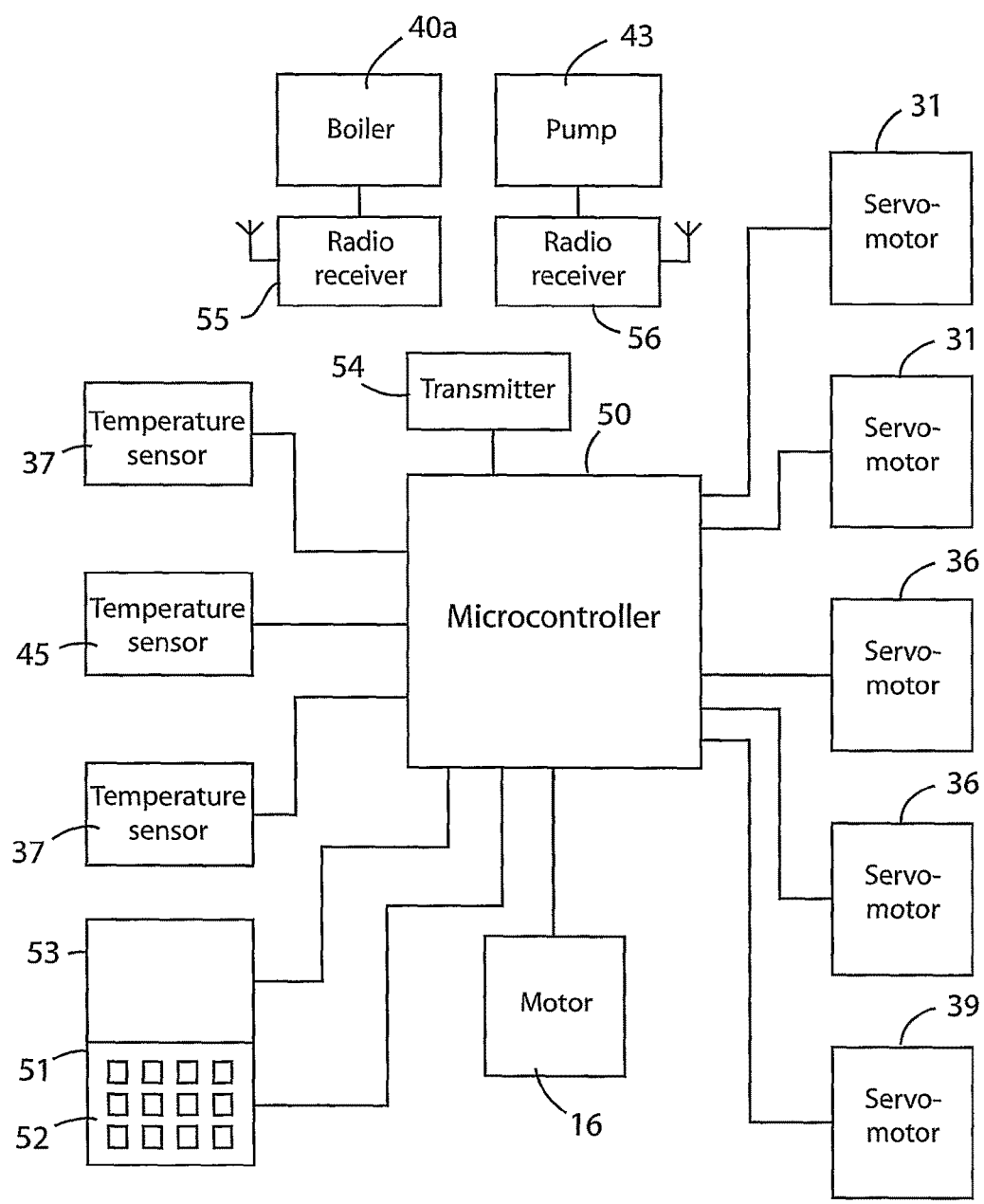
Figure 7:
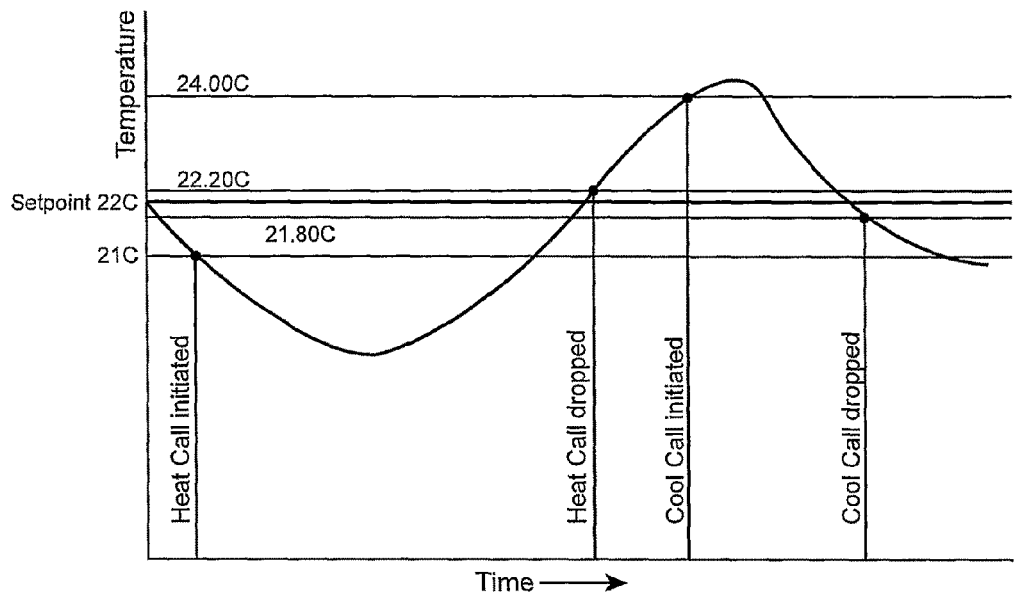
Figure 8:
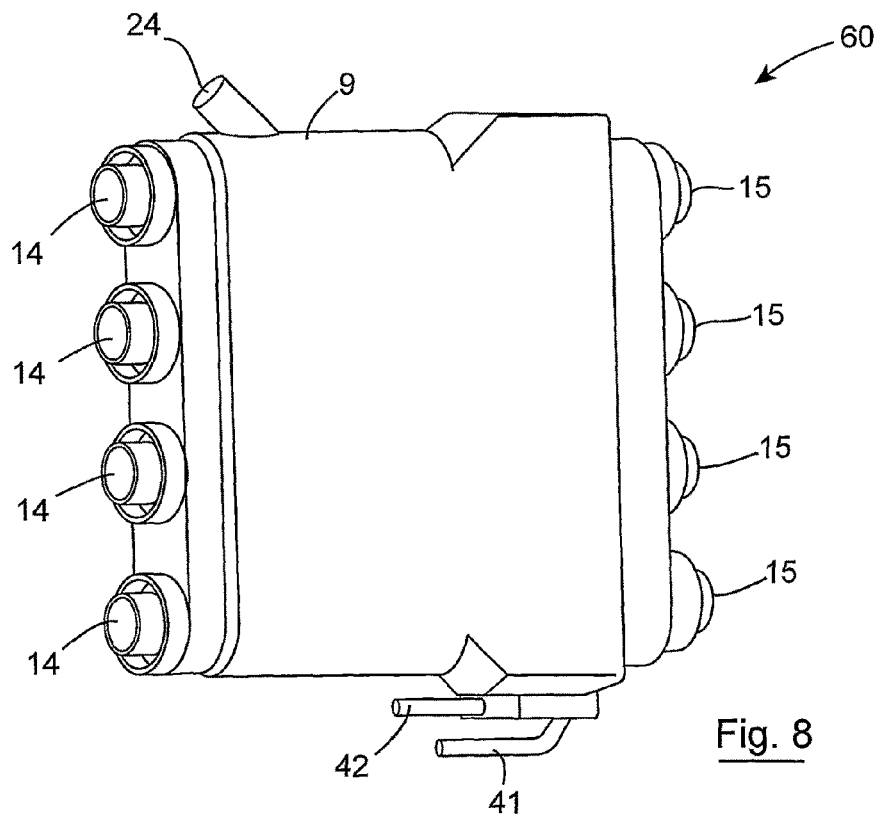
Figure 9:
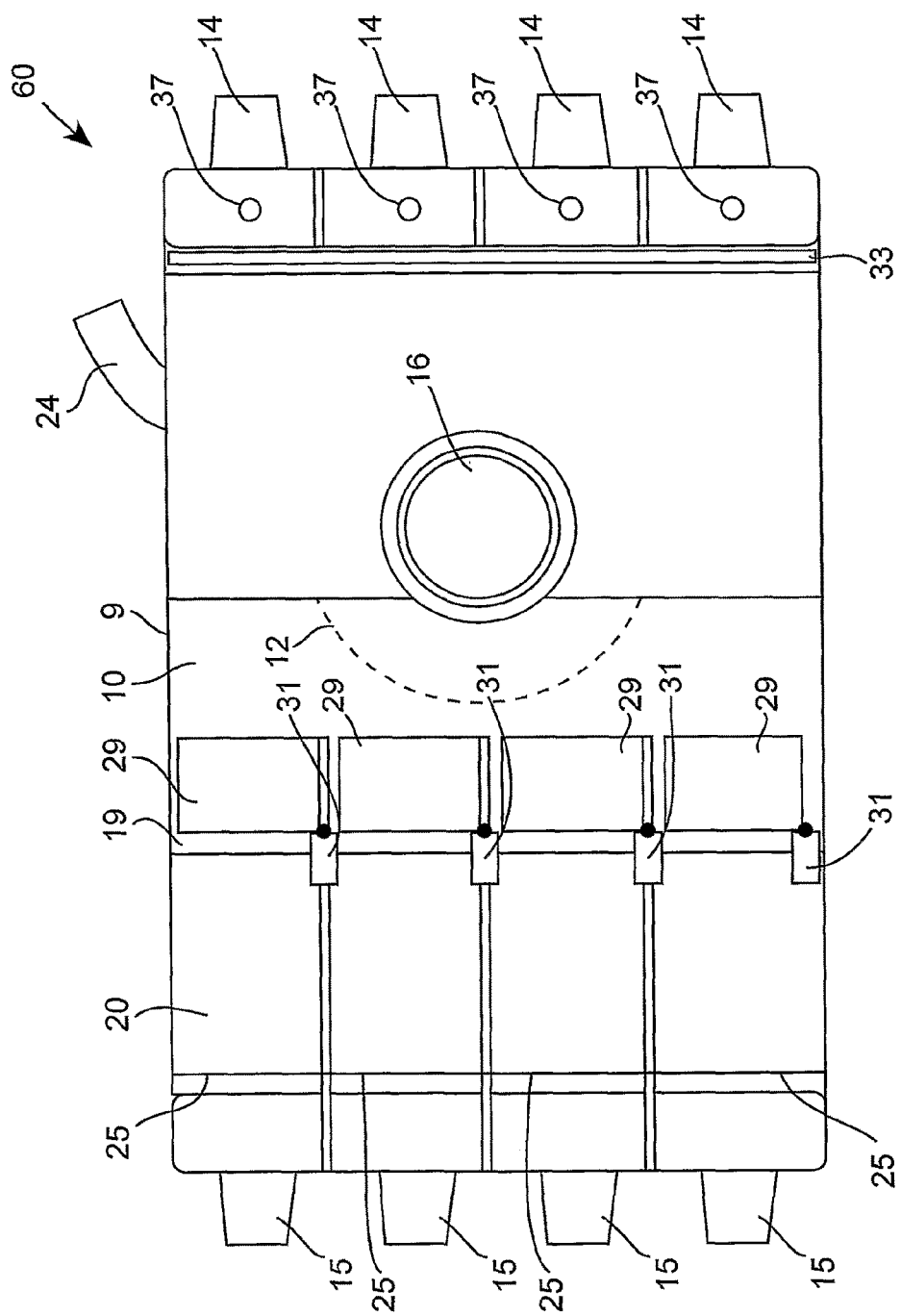
Figures 10, 11, 12:
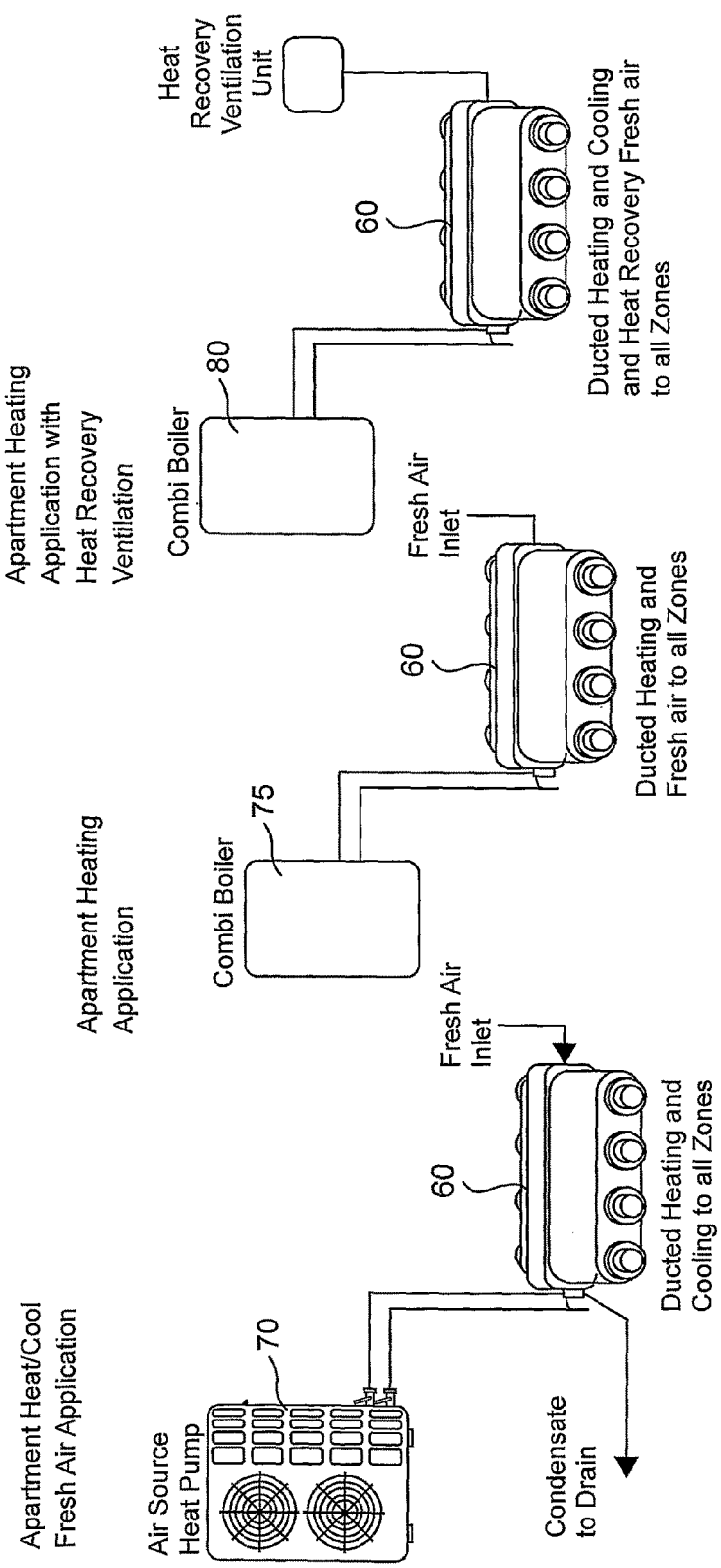
Figure 13:
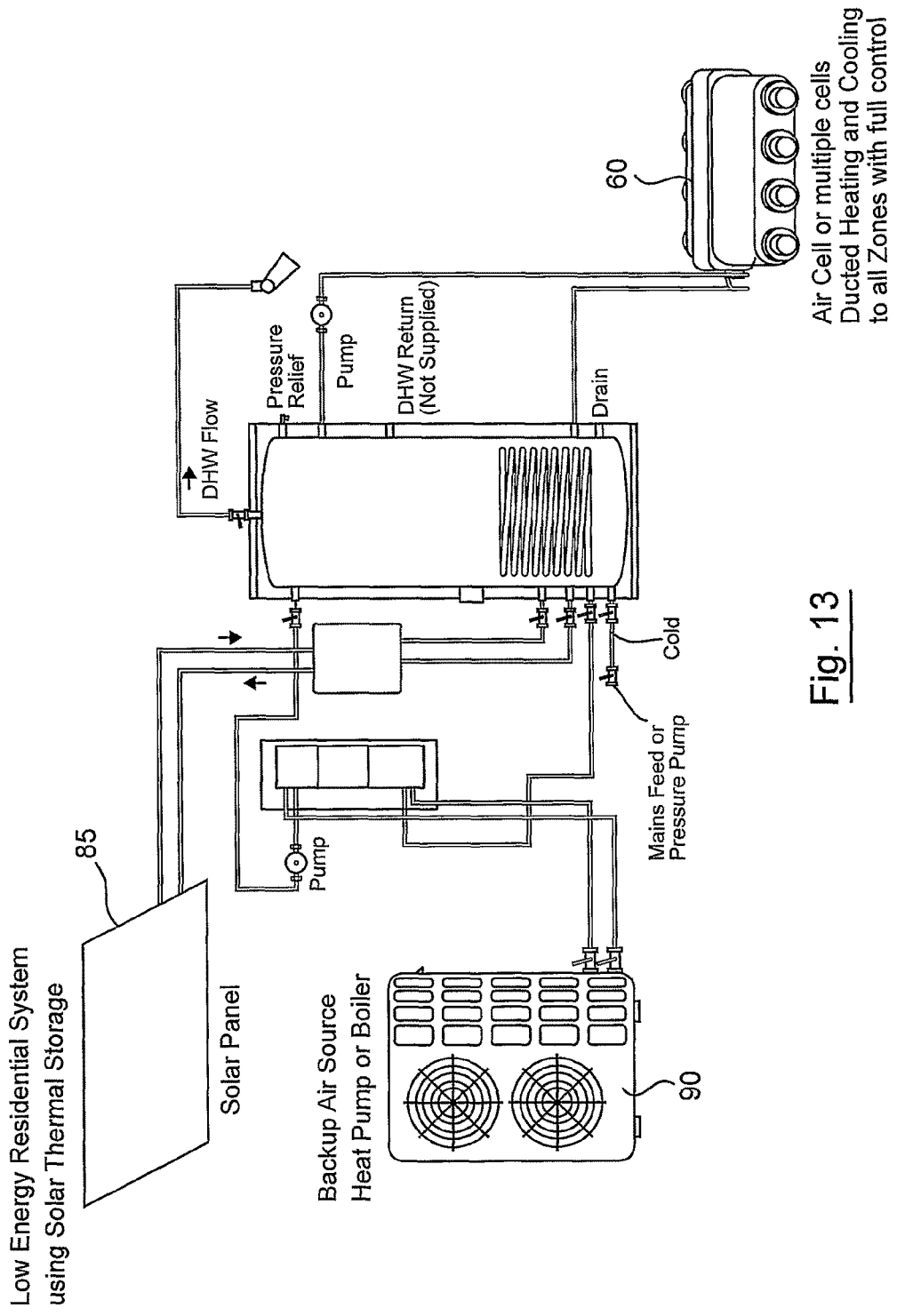

The invention will be more clearly understood from the following description of some preferred embodiments thereof, which are given by way of example only, with reference to the accompanying drawings, in which:

FIG. 1 is a block representation of a system according to the invention for controlling temperature in a plurality of respective zones in a building, FIG. 2 is a cross-sectional top plan view of apparatus also according to the invention for controlling temperature in a plurality of respective zones in a building for use in the system of FIG. 1, FIG. 3 is a view similar to FIG. 2 of the apparatus of FIG. 2 with portions of the apparatus in different states to that of FIG. 2, FIG. 4 is a cross-sectional side elevational view of the apparatus of FIG. 2, FIG. 5 is a view similar to FIG. 4 of the apparatus of FIG. 2 with portions of the apparatus in different states to that of FIG. 4, FIG. 6 is a block representation of a control circuit of the apparatus of FIG. 1, FIG. 7 is a graphical representation of a plot of temperature against time of return air to the apparatus of FIG. 2, FIG. 8 is a perspective view of apparatus according to another embodiment of the invention for use with the system of FIG. 1, FIG. 9 is a cross-sectional plan view of the apparatus of FIG. 8, FIG. 10 is a circuit diagram illustrating the apparatus of FIG. 8 coupled to an energy source, FIG. 11 is a view similar to FIG. 10 of the apparatus of FIG. 8 coupled to another energy source, FIG. 12 is a view similar to FIG. 10 of the apparatus of FIG. 8 coupled to another energy source, and FIG. 13 is a view similar to FIG. 10 of the apparatus of FIG. 8 coupled to another energy source.

Referring to the drawings and initially to FIGS. 1 to 6 thereof, there is illustrated a system according to the invention, indicated generally by the reference numeral 1, for controlling the temperature in a plurality of zones of a building, in this case, for controlling the temperature of two rooms 2 in a domestic dwelling, which may be an apartment or a small house. The system 1 comprises apparatus also according to the invention, indicated generally by the reference numeral 5, which is operable for controlling the temperature in the rooms 2 of the domestic dwelling. The apparatus 5, as will be described below, may heat or cool, as required, air for circulating to and from the respective rooms 2. Two flow ducts 7 are coupled to the apparatus 5 for accommodating flow air to the respective rooms 2, and two return ducts 8 from the respective rooms 2 return air from the rooms 2 to the apparatus 5 for subsequent circulation through the apparatus 5 and to the rooms 2 through the flow ducts 7, as will be described in more detail below. However, before describing the system in further detail, the apparatus 5 will first be described.

Although for ease of understanding the invention the system 1 and the apparatus 5 have been described as being suitable for controlling the temperature in two rooms, in practice the system and the apparatus 5 typically will be provided for controlling the temperature in four zones or rooms 2, and such an apparatus which is suitable for controlling the temperature in four zones or rooms 2, is described with reference to FIGS. 8 and 9.

Referring in particular to FIGS. 2 to 5, the apparatus 5 comprises a housing 9 of a plastics material which defines a hollow interior region 10. The hollow interior region 10 forms a central impeller chamber 11 within which an air circulating means, namely, a backward curved impeller 12 is located for circulating air through the hollow interior region 10 between two inlet ports 14 to which the respective return ducts 8 are coupled, and two outlet ports 15 to which the two respective flow ducts 7 are coupled. An electrically powered motor which in this case comprises an electronically commutated DC motor 16 is located in the hollow interior region 10, and is coupled to the impeller 12 for driving the impeller 12. The hollow interior region 10 of the housing 9 also forms a heat exchange chamber 19 located between and communicating with the central impeller chamber 11 and the outlet ports 15 for accommodating a heat exchange means, namely, a multi-zone heat exchanger 20 for heating or cooling flow air urged by the impeller 12 through the heat exchanger 20 to the outlet ports 15 as will be described below. A common inlet chamber 22 located upstream of the central impeller chamber 11 and between the inlet ports 14 and the central impeller chamber 11 communicates the inlet ports 14 with the central impeller chamber 11, and receives return air from the rooms 2 through the inlet ports 14. The electric motor 16 is located in the common inlet chamber 22. A fresh air inlet port 24 communicates with the common inlet chamber 22 upstream of the central impeller chamber 11 for accommodating fresh air into the common inlet chamber 22 for mixing with return air in the common inlet chamber 22 prior to being urged by the impeller 12 through the outlet ports 15 and returned to the rooms 2, as will be described below.

The heat exchanger 20 in this embodiment of the invention is a coil heat exchanger and comprises two heat exchange zones 25 which define respective mutually isolated flow air heat exchange paths 26 which extend from the central impeller chamber 11 through the corresponding heat exchange zones 25 to the corresponding outlet port 15, so that the respective flow air heat exchange paths 26 from the central impeller chamber 11 to the respective outlet ports 15 are mutually isolated from each other. Two flow air, bypass paths 28 which correspond to the respective flow air heat exchange paths 26 extend from the central impeller chamber 11 to the outlet ports 15 and are also mutually isolated from each other for accommodating flow air from the central impeller chamber 11 to the outlet ports 15 with the flow air bypassing the corresponding flow air heat exchange paths 26 defined by the respective heat exchange zones 25.

Two primary valve means, which in this embodiment of the invention are provided by two primary air flaps 29 are pivotally mounted within the hollow interior region 10 about a primary pivot axis 30 between the central impeller chamber 11 and the heat exchange chamber 19. Each primary air flap 29 is selectively and linearly operable between a first state illustrated in FIGS. 3 and 5 for directing flow air from the central impeller chamber 11 through the corresponding flow air heat exchange path 26 and a second state illustrated in FIGS. 2 and 4 for directing flow air from the central impeller chamber 11 through the corresponding flow air bypass path 28 in response to the temperature of the return air from the respective zones as will be described below. A servo-motor 31 is provided for each primary air flap 29 to operate the corresponding primary air flap 29 between the first state and the second state independently of the other primary air flap 29.

Two secondary valving means, namely, two secondary air flaps 34 are located within the hollow interior region 10 adjacent the inlet ports 14 for isolating the inlet ports 14 from the common inlet chamber 22 to prevent return air being drawn into the inlet chamber 22 from a room, the temperature of which is not to be controlled. Each secondary air flap 34 is pivotal about a secondary pivot axis 35, and is operable by a corresponding servo-motor 36 between an isolating state illustrated in FIGS. 3 and 5 isolating the corresponding inlet port 14 from the inlet chamber 22 and a communicating state illustrated in FIGS. 2 and 4 communicating the corresponding inlet port 14 with the common inlet chamber 22.

Two return air temperature sensing means, namely, two return air temperature sensors 37 are located in the inlet ports 14 for detecting the temperature of the return air being returned through the inlet ports 14 from the respective rooms 2 prior to the return air entering the common inlet chamber 22. A filter means, namely, a filter 33 filters the return air as it passes from the respective inlet ports 14 to the common inlet chamber 22.

A fresh air control valve means comprising a fresh air control flap 38 is pivotally mounted adjacent the fresh air inlet port 24, and is selectively operable by a servo-motor 39 in an isolating state for isolating the fresh air inlet port 24 from the common inlet chamber 22 and a communicating state for communicating the fresh air inlet port 24 with the common inlet chamber 22 for accommodating fresh air into the common inlet chamber 22 for mixing with the return air from the return ducts 8. The fresh air control flap 38 is also operable by the servo-motor 39 as will be described below in a plurality of intermediate states for varying the volume of fresh air being drawn through the fresh air inlet port 38 into the common inlet chamber 22.

A fresh air temperature sensor 45 is located adjacent the fresh air inlet port 24 for monitoring the temperature of fresh air being drawn into the common inlet chamber 22 by the impeller 12.

An energy source 40 which may be a boiler or a chiller, or may comprise both a boiler and a chiller, or may be a reverse cycle heat pump as will be described below is provided for providing heating and/or cooling to the heat exchanger 20. Heating and/or cooling is transferred between the heat source 40 and the heat exchanger 20 by a heat exchange medium, which in this embodiment of the invention is water. A water inlet 41 to the heat exchanger 20 accommodates the heat exchange water from the energy source 40 and a water outlet 42 from the heat exchanger 20 accommodates heat exchange water from the heat exchanger 20 to the energy source 40. A circulating pump 43 pumps the heat exchange water between the energy source 40 and the heat exchanger 20 through a flow pipe 48 and a return pipe 49.

Each flow duct 7 is provided by a small bore tube of circular transverse cross-section of 50 mm diameter and terminates in a venturi nozzle 44 which defines a circular outlet orifice of 50 mm diameter for delivering the flow air into the corresponding room 2. The venturi nozzles 44 of the respective flow ducts 7 are located in the ceiling of the respective rooms 2 in an off centre location for directing air downwardly into the rooms 2. Typically, the venturi nozzles 44 are located in the ceiling at a distance D of approximately 150 mm to 200 mm from an adjacent wall in order to generate a high velocity air stream flowing downwardly along the wall in order to minimise down drafts towards the central living area of the room 2, and in order to promote aspiration, which in turn promotes circulation of air within the room.

Each return duct 8 is also provided by a small bore tube of circular transverse cross-section of 50 mm diameter. An inlet opening 46 to each return duct 8 is of similar diameter to that of the return duct 8, and is located at a relatively low level in the room 2, typically, at skirting board level, or at a level in a wall of the room below midway between the floor and the ceiling, for example, through a decorative grill or the like located on the wall.

A control means, in this embodiment of the invention a programmable microcontroller 50 controls the operation of the system as will now be described. An input means comprising an interface 51 which comprises a keypad 52 and visual display screen 53 is provided for inputting data into the microcontroller 50. The data which is inputtable into the microcontroller 50 through the interface 51 comprises the temperature set point values at which the temperatures in the respective rooms 2 are to be maintained, and the respective time bands during which the temperatures in the respective rooms 2 are to be maintained at the respective temperature set point values. In this embodiment of the invention the microcontroller 50 is programmed to support two time bands for each room 2, thereby facilitating the inputting of two temperature set point values, one for each time band for each room 2. For example, one time band may be a time period during the day when the desired temperatures in the respective rooms may be maintained at relatively low temperatures, while the other time band may be a time band during the evening during which the respective temperature set point values for the respective rooms would be set at respective higher desired levels.

The microcontroller 50 is programmed to read signals from the respective temperature sensors 37 and to determine from the read signals the temperature of the return air from the respective rooms 2. By determining the temperature of the return air as it returns to the respective inlet ports 14 the temperature of the air in the respective rooms 2 can be determined. In general, the temperature of the return air detected by the return air temperature sensors 37 will be substantially similar to the temperature of the air in the corresponding rooms 2. However, where there is a slight temperature drop between the actual room temperature and the return air temperature detected by the return air temperature sensors 37, the microcontroller 50 is programmed to appropriately compensate for such a temperature drop.

The microcontroller 50 is programmed to control the operation and the speed of operation of the motor 16 for in turn controlling the operation of the impeller 12 in response to the temperature determined from the respective temperature sensors 37, as will be described below. The microcontroller 50 is also programmed to operate the servo-motors 31 for in turn operating the respective primary air flaps 29 in the appropriate one of the first and second states for selectively directing the flow air through the flow air heat exchange paths 26 or the flow air bypass paths 28 corresponding to the respective rooms 2 in response to the temperatures determined from the respective return air temperature sensors 37.

The microcontroller 50 is also programmed to operate the servo-motor 39 for in turn operating the fresh air control flap 38 in either an isolating state or a communicating mode for either isolating the fresh air inlet port 24 from the common inlet chamber 22 or for setting the fresh air control flap 38 at an appropriate setting depending on whether fresh air is required or not, and if fresh air is required, depending on the volume intake of fresh air required to raise or lower the temperature of the flow air being circulated to the respective rooms. Whether fresh air is drawn into the common inlet chamber 22 for mixing with the return air therein is also dependent on the relative relationship between the external fresh air temperature and the temperature of the respective rooms 2. The microcontroller monitors signals from the fresh air temperature sensor 45 so that during periods when the fresh air control flap 38 is operated in the communicating mode and fresh air is being drawn into the common inlet chamber 22 the temperature of the fresh air being drawn in through the fresh air port 24 can be determined by the microcontroller 30 from signals read from the fresh air temperature sensor 45. Additionally, the microcontroller 50 operates the servo-motor 39 of the fresh air control flap 38 in order that during normal operation of the apparatus the air circulated by the apparatus 5 is made up of an average minimum 10% of fresh air which is drawn in through the fresh air inlet port 24.

The microcontroller 50 is also programmed to operate the servo-motors 36 for in turn operating the secondary air flaps 34 into the respective communicating and isolating states, depending on whether the temperature of the corresponding room 2 is to be controlled.

Additionally, the microcontroller 50 is programmed to output respective signals to the energy source 40 and the circulating pump 43 to activate or deactivate the energy source 40 and/or the circulating pump 43 in response to the temperatures of the respective rooms 2 determined from the return air temperature sensors 37. When no heating or cooling, depending on the energy source 40 is required the signals transmitted by the microcontroller 50 are deactivating signals for deactivating the energy source 40 and the circulating pump 43. When heating or cooling is required, depending on the energy source 40, the signals outputted by the microcontroller 50 are activating signals for activating the energy source 40 and the circulating pump 43. A radio transmitter 54 operated under the control of the microcontroller 50 transmits the activating and deactivating signals for reception by respective radio receivers 55 and 56 coupled to the boiler 40a and the circulating pump 43, respectively.

The impeller 12 is sized and driven at an appropriate speed by the motor 16 so that the flow air is urged through the flow ducts 7 at a relatively high velocity, in this embodiment of the invention a velocity of 9M per second. This, thus, results in the flow air being delivered into each room 2 through the corresponding venturi nozzle 44 as a jet of flow air at a relatively high velocity of 9M per second to 10M per second. This results in a low pressure zone being created around the high velocity jet of flow air as it enters the room 2, which in turn causes air in the room 2 to circulate towards the low pressure zone, thereby providing an efficient air circulating means in the respective rooms 2. The flow rate of 9M per second of the flow air through each flow ducts 7 corresponds to a delivery rate of flow air through each flow duct 7 of $1.0M^3$ per minute being delivered into each room 2.

The operation of the system 1 according to the invention will become clear from the following description of the use of the system 1 and the apparatus 5. The system 1 is installed in a dwelling house with the apparatus 5 located in a suitable location for minimising the length of the flow ducts 7 and the return ducts 8 between the two rooms 2, the temperature of which are to be controlled. The flow ducts 7 and the return ducts 8 are installed so that the respective venturi nozzles 44 are located in the ceiling of the respective rooms at a distance of between 150 mm and 200 mm from an adjacent wall in order to generate a high velocity air stream flowing downwardly along the adjacent wall to minimise down drafts towards the central area of the room. The return ducts 8 are installed with the inlet opening located in the lower half of a wall of the corresponding room. Preferably, adjacent skirting board level.

The water inlet 41 and the water outlet 42 of the heat exchanger 20 are connected to, in this embodiment of the invention, a boiler 40a by the flow and return pipes 48 and 49 with the circulating pump 43 located in the return pipe 49.

The temperature set point values at which the temperature of each room 2 is to be controlled during the respective time bands, and the duration of the respective time bands are inputted through the keypad 52 by a user. Once the two temperature set point values and the respective time bands have been inputted for each of the rooms 2, the apparatus 5 is ready to operate.

Initially, on start-up the apparatus 5 is operated in a start-up mode. In the start-up mode the fresh air control flap 38 is operated by the servo-motor 39 into the isolating state, and the secondary air flaps 34 are operated by their respective servo-motors 36 into the communicating state, and are retained in the communicating state by the corresponding servo-motors 36 for so long as the apparatus 5 is operating, unless the temperature of the corresponding room 2 is not to be controlled, and in which case, the secondary air flap 34 corresponding to that room is operated by the corresponding servo-motor 36 into the isolating state and is retained in the isolating state by the servo-motor 36 until the temperature of that room is again to be controlled. Additionally, in the start-up mode the servo-motors 31 are operated under the control of the microcontroller 50 to set the primary air flaps 29 in the respective second states for directing flow air from the impeller 12 through the flow air bypass paths 28 and in turn through the outlet ports 15 and into the flow ducts 7 for delivery to the respective rooms 2.

With the apparatus so set up, the motor 16 is operated under the control of the microcontroller 50 to drive the impeller 12 at a preset speed which is selected based on the air volume of the rooms 2 and the temperatures at which the rooms 2 are to be controlled. The apparatus 5 is operated in the start-up mode for two minutes during which the microcontroller 50 monitors the return air temperature sensors 37 for determining the temperature of the return air from the respective rooms 2, and for determining when the temperature of the return air is in a steady state condition, so that the temperatures in the respective rooms 2 can be determined from the return air temperatures detected by the return air temperature sensors 37.

When the microcontroller 50 has determined that the temperature of the return air read from each return air temperature sensor 37 is in a steady state condition, and is thus indicative of the air temperature in the corresponding room 2, the microcontroller 50 is programmed to compare the steady state temperature read from the corresponding return air temperature sensor 37 with the temperature set point value for the corresponding room, and depending on whether heating or cooling is required in the room 2, the corresponding servo-motor 31 is operated for setting the corresponding primary air flap 29 in the appropriate one of the first and second states. If heating is required for that room 2 the corresponding primary air flap 29 is operated to direct the flow air through the corresponding flow air heat exchange path 26 and in turn through the corresponding outlet port 15 to that room 2. On the other hand, since in this embodiment of the invention the energy source is provided by the boiler 40a only, if cooling is required the corresponding primary air flap 29 is operated for directing the flow air through the corresponding flow air bypass path 28 and in turn through the outlet port 15 to that room 2. If sufficient cooling cannot be achieved by directing the flow air for that room through the flow air bypass path 28, and if the external fresh air temperature relative to the temperature of the room is such that fresh air would cool the room, the microcontroller 50 is programmed to operate the servo-motor 39 to operate the fresh air control flap 38 into the communicating state for admitting fresh air into the common inlet chamber 22 for mixing with the return air for delivery through the corresponding flow air bypass path 28 and in turn through the corresponding outlet port 50 to that room 2. The microcontroller 50 when operating the servo-motor 39 to operate the fresh air control flap 38 into the communicating state sets the servo-motor 39 and in turn the fresh air control flap 38, so that the appropriate fresh air intake volume is drawn into the common inlet chamber 22 for mixing with the return air therein.

During operation of the apparatus 1 if the boiler 40a has been deactivated as a result of heating not being required, as will be described below, on the microcontroller 50, determining from the return air temperatures detected by the return air temperature sensors 37 that heating is required, the microcontroller 50 transmits signals to the boiler 40a and the circulating pump 43 to activate the boiler 40a and the circulating pump 43. Similarly, if during operation of the apparatus the microcontroller 50 determined from the temperatures detected by the return air temperature sensors 37 that heating is no longer required, the microcontroller 50 outputs the signals to the boiler 40a and to the circulating pump 43 to deactivate the boiler 40a and the circulating pump 43.

During normal running of the apparatus 5 the microcontroller 50 continuously monitors the signals from the return air temperature sensors 37 for in turn determining the return air temperature from the respective rooms 2. The return air temperature is monitored at intervals of one second over a five second period and the average return air temperature over the five second period is deemed to be the temperature of the return air from the corresponding room 2.

As the temperatures determined by the microcontroller 50 from the return air temperature sensors 37 vary above or below the set point, as the case may be, the corresponding primary air flaps 29 are operated by the respective servo-motors 31 under the microcontroller 50 to either direct the flow air through the flow air heat exchange paths 26 or the flow air bypass paths 28.

The primary air flaps 29 are operated independently of each other so that one of the primary air flaps 29 may be operated in the first state to provide heating to the corresponding room 2, while the other primary air flap 29 may be operated in the second state to provide cooling to the corresponding room 2. In apparatus where more than two flow air heat exchange paths and more than two corresponding flow air bypass paths are provided with corresponding primary air flaps, each of the primary air flaps will be operable independently of the others.

The servo-motors 31 of the primary air flaps 29 are operated under the control of the microcontroller 50 with a pulse width modulated signal, so that the time taken by the primary air flaps 29 to transition between the first state and the second state takes approximately 10 seconds. This relatively slow transitioning of the primary air flaps 29 between the first and second states avoids sudden air velocity changes and avoids sudden noise being generated, which would otherwise arise if the transitioning of the primary air flaps 29 between the first and second states were substantially instantaneous.

After the initial start-up mode, the apparatus is operated under the control of the microcontroller 50 in a normal operating mode. During operation of the apparatus 5 in the normal operating mode, the microcontroller 50 controls the speed of the motor 16 to drive the impeller 12 to maximise the efficiency of operation of the system 1 and the apparatus 5. As the number of primary air flaps 29, in this case, both primary air flaps 29 which are operating in the second state directing flow air through the respective flow air bypass paths 28 increases, the speed of the impeller 12 is correspondingly reduced. When all the primary air flaps 29 are operating in the second state directing flow air through the flow air bypass paths 28 for a continuous period greater than a first predefined time period, which in this embodiment of the invention is five minutes, the microcontroller 50 transmits a deactivation signal to the boiler 40a and to the circulating pump 43 to deactivate both the boiler 40a and the circulating pump 43. On the other hand, if the energy source instead of being provided by the boiler 40a was provided by a chiller unit, and the primary air flaps 29 had been operating in the second state for a period greater than the first predefined time period of two minutes, the microcontroller 50 would likewise output a deactivation signal to the chiller unit and the circulating pump 43 for deactivating both the chiller unit and the circulating pump 43.

Additionally, if no heating is required for the respective rooms 2, in other words, if all the primary air flaps 29, in this case the two primary air flaps 29 remain in the second state directing flow air through the flow air bypass paths 28 for a continuous second predefined time period of approximately ten minutes, which includes the first predefined time period of five minutes, the microcontroller 50 reduces the speed of the motor 16 to a predefined low level in order to minimise energy consumption for a third predefined time period of approximately five minutes. The predefined low level speed at which the motor 16 and the impeller 12 are operated during the third predefined time periods is such as to be sufficient to draw return air from the respective rooms 2 at a rate which is just sufficient to allow the temperature in the rooms to be determined from signals read from the return air temperature sensors 37 during the third predefined time periods. During the third predefined time periods the boiler 40a and the circulating pump 43 remain deactivated.

At the end of the third predefined time period the apparatus 5 is again operated by the microcontroller 50 in the start-up mode to again determine the temperature of the return air from the rooms 2 from signals read from the return air temperature sensors 37 when the return air is in a steady state condition at the end of the two minute time period of the start-up mode. If the microcontroller 50 determines that heating is still not required, the microcontroller 50 operates the apparatus again with the motor 16 at the predefined low level speed for a further third predefined time period of approximately five minutes. During this third predefined time period the boiler 40a and the circulating pump 43 is similarly deactivated. At the end of that and each subsequent third predefined time period the apparatus is operated in the start-up mode, and if heating is not required, the microcontroller 50 again operates the apparatus 5 with the motor 16 operating at the predefined low level speed and continues to maintain the boiler 40a and the circulating pump 43 deactivated for a further third predefined time period.

If at the end of any third predefined time period after the apparatus 5 has been operated in the start-up mode the microcontroller 50 determines that heating is required from either or both of the rooms 2, the microcontroller 50 transmits activation signals to the boiler 40a and the circulating pump 43 to reactivate the boiler 40a and the circulating pump 43 and operates the relevant one or both of the primary air flaps 29 into the first state for directing the flow air through the flow air heat exchange path or paths 26 as the case may require. During operation of the primary air flap or primary air flaps 29 into the first state, the microcontroller 50 increases the speed the motor 16 to drive the impeller 12 at its normal operating speed to circulate air through the apparatus 1 and in turn to draw return air from the respective rooms 2 and to deliver flow air to the rooms 2 through the flow ducts 7 at the high velocity. The flow air being delivered to each room 2 which requires heating is directed by the corresponding primary air flap 29 through the flow air heat exchange path 26. Thereafter, the apparatus 5 is operated in the normal mode.

If at the end of any second predefined time period, or if during any second predefined time period the microcontroller 50 determines from signals from the return air temperature sensors 37 that heating is required for one or both of the rooms 2, the microcontroller 50 transmits activating signals to the boiler 40a and to the circulating pump 43 to reactivate the boiler 40a and the circulating pump 43, and the apparatus is operated in the normal mode.

In this embodiment of the invention the microcontroller 50 is also programmed, when the system 1 is operating with only a boiler or a chiller unit, to set a narrow temperature band around the respective temperature set point values within which the temperatures of the rooms 2 are controlled. The narrow temperature band is from 0.2° C. below the temperature set point value to 0.2° C. above the temperature set point value. Thus, where the entered temperature set point value is 22° C., the microcontroller 50 is programmed to set the upper temperature of the narrow band at a temperature of 22.2° C., which is the temperature of the return air at which the appropriate one of the primary air flaps 29 is operated into the second state and to set the lower temperature of the narrow band at 21.8° C., so that when the temperature of the return air detected from one of the return air temperature sensors 37 falls to 21.8° C. the corresponding primary air flap 29 is operated into the first state.

As discussed above the system 1 may be operated with the heat exchanger 20 selectively coupleable to both a boiler, for example, the boiler 40a, and a chilling unit. As illustrated, for example, in FIG. 12. In which case, the microcontroller 50 when a temperature set point value at which a room 2 is to be maintained is entered through the keypad 52, the microcontroller 50 is programmed to set a narrow temperature band and a wide temperature band which define respective upper and lower temperatures at which action is taken by the microcontroller 50 to control the temperature of the rooms 2. Referring in particular to FIG. 7 a waveform is illustrated which shows a typical temperature cycle which would be detected by one of the temperature sensors 37 when the apparatus 5 is operated in conjunction with a boiler and a chilling unit. In the waveform of FIG. 7 return air temperature is plotted on the vertical Y axis, while time is plotted on the horizontal X axis. The narrow temperature band ranges from 0.2° C. below the temperature set point value to 0.2° C. above the temperature set point value, while the wide temperature band ranges from 1.0° C. below the temperature set point value to 2.0° C. above the temperature set point value. When the temperature set point value is 22° C., the upper and lower temperature values of the narrow temperature band are 22.2° C. and 21.8° C., respectively. The upper and lower temperature values of the wide temperature band are 24° C. and 21° C., respectively. The upper and lower temperature values of 22.2° C. and 21.8° C. of the narrow temperature range are the temperatures at which the primary air flaps 29 are operated from the first state to the second state and from the second state to the first state, respectively. The upper and lower temperature values of 24° C. and 21° C. of the wide temperature band are the temperatures at which the chilling unit and the boiler, as the case may be, are activated for providing cooling or heating, as the case may be, to the heat exchanger 20. The boiler is activated when the return air temperature from any of the rooms 2 drops to the lower temperature of the wide temperature band, namely, 21° C., and the boiler is deactivated when the return air temperature from both rooms rises to the upper temperature of the narrow temperature band, namely, 22.2° C. The chilling unit is activated when the return air temperature from any of the rooms 2 rise to the upper temperature of the wide temperature band, namely, 24° C., and the chilling unit is deactivated when the return air temperature from both of the rooms drops to the lower temperature of the narrow temperature band, namely, 21.8° C. By providing a narrow temperature band at which the primary air flaps 29 are operated and the wider temperature band at which the boiler and chilling unit are activated avoids any danger of the apparatus 5 operating with undesirable hysteresis.

During normal operation of the apparatus 5 the microcontroller 50 when the fresh air control flap 38 is in the communicating state monitors the fresh air temperature sensor 45 to determine the temperature of fresh air being drawn in through the fresh air port 24. When the apparatus 5 is to operate with the temperature set point value set at 22° C., if the temperature determined from the return temperature sensors 37 of the return air from any of the rooms 2 rises to 22.2° C., the microcontroller 50 operates the fresh air control flap 38 in the communicating state, so that fresh air is drawn by the impeller 12 into the common inlet chamber 22 and mixed with the return air. The fresh air control flap 38 is set to admit fresh air through the fresh air inlet port 24 at an appropriate volume rate to achieve the desired degree of cooling. This generates passive cooling in the event that no cooling or chilling unit is provided, for example, in the present case where the boiler 40a is provided as the only energy source.

Referring now to FIGS. 8 and 9 there is illustrated apparatus according to another embodiment of the invention indicated generally by the reference numeral 60. The apparatus 60 is suitable for controlling the temperature in four zones, namely, four rooms 2 of a domestic dwelling. The apparatus 60 is substantially similar to the apparatus 5 and similar components are identified by the same reference numerals. The main difference between the apparatus 60 and the apparatus 5 is that the apparatus 50 is provided with four inlet ports 14 and four outlet ports 15, and the heat exchanger 20 is a four zone heat exchanger. The zones of the heat exchanger 20 define respective mutually isolated flow air heat exchange paths 26 between the central impeller chamber 11 and the outlet ports 15. Four corresponding mutually isolated flow air bypass paths 28 are also provided between the central impeller 11 and the corresponding outlet ports 15 which correspond to the flow air heat exchange paths 26. Four corresponding primary air flaps 29 with corresponding servo-motors 31 are also provided for independently directing the flow air from the central impeller chamber 11 to the corresponding outlet port 15 through a selected one of the corresponding flow air heat exchange path 26 and the flow air bypass path 28. Additionally, four secondary air flaps 34 with corresponding servo-motors 37 are provided for selectively isolating and communicating the corresponding inlet ports 14 with the common inlet chamber 22. Similarly, four temperature sensors 37 for sensing return air temperature through the respective inlet ports 14 are also provided.

A single fresh air inlet port 24 to the common inlet chamber 22 is provided and a fresh air control flap (not shown) with a corresponding servo-motor (also not-shown) is provided for selectively isolating and communicating the fresh air inlet port 24 with the common inlet chamber 22 in a similar manner as described with reference to the apparatus 5. A microcontroller (not shown) but similar to the microcontroller 50 of the apparatus 5 controls the operation of the apparatus 60 in a similar manner as the microcontroller 50 controls the apparatus 5.

The apparatus 60 may be coupled to a single heat source, for example, a boiler or a chiller unit, or both a boiler and a chiller unit. A flow duct 7 couples each outlet port 15 to the corresponding room 2, and each flow duct 7 terminates in a venture nozzle 44 as described with the system 1 with reference to FIGS. 1 to 7. Each inlet port 14 is coupled to a return duct 8 through which return air is drawn from the corresponding room 2 to the common inlet chamber 22 by the impeller 12.

Otherwise the apparatus 60 is similar to the apparatus 5, and when connected into a system similar to the system 1 its operation is likewise similar.

Referring now to FIG. 10, the heat exchanger 20 of the apparatus 60 is illustrated coupled to an air source heat pump 70. In FIG. 11 the heat exchanger 20 of the apparatus 60 is illustrated coupled to a boiler 75, which in this embodiment of the invention is a combi boiler. In FIG. 12 the heat exchanger 20 of the apparatus 60 is illustrated also coupled to a combi boiler 75, and the fresh air inlet port 24 is illustrated coupled to a heat recovery ventilation unit 80.

In FIG. 13 the heat exchanger 20 of the apparatus 60 is illustrated coupled to a heating system which includes a solar panel 85, a back-up air source heat pump or a boiler 90.

The advantages of the invention are many. A particularly important advantage of the invention is that it provides a relatively simple and inexpensive heating and/or cooling system which is inexpensive to produce, inexpensive to install, inexpensive to operate and requires minimum disruption in a building when being retrofitted.

Another advantage of the invention is that by virtue of the fact that the return air temperature is being monitored from the respective rooms as the return air is being drawn into the apparatus 5, there is no need for individual temperature sensors to be located in the rooms and connected back to the apparatus.

Additionally, by virtue of the fact that the flow air is delivered into the rooms by venturi nozzles at high velocities, air circulation is achieved by aspiration within the rooms at minimum cost.

A further particularly important advantage of the invention is that it permits the control of the temperature in a plurality of zones, which may be rooms or otherwise of a building with a single air circulating means, namely, a single impeller driven by a single motor, since the single impeller delivers air through the respective heat exchange paths or the corresponding bypass paths through the outlet ports of the apparatus to the respective zones. Additionally, the apparatus according to the invention provides for the heating and/or cooling, as the case may be, of the respective zones of the building using a single heat exchanger whereby the heat exchanger defines the respective heat exchange paths through which flow air to the respective zones pass. By providing heating and/or cooling to the zones using a single heat exchanger, the heat exchanger may be supplied with heating and/or chilling from a single source without the need for complex circuitry, valving and control systems. When no heating or chilling is required, the boiler and/or chilling unit, as the case may be, and the circulating pump are deactivated, and when heating or chilling is required, the corresponding one of the boiler and chilling unit is activated, as is the circulating pump. No valves or control circuitry for controlling the supply of heat exchange water to the heat exchanger is required. In other words, the apparatus according to the invention merely requires a single heat exchange water circuit without any control valves for controlling the circulating water between the heat exchanger and the appropriate one of the boiler or the chilling unit.

Another particularly important advantage of the invention is that the apparatus operates relatively silently, and the zones in which the temperature is being controlled are isolated from any noise generated by the apparatus. This is due to the fact that the flow and return ducts, and in particular, the flow ducts, being provided as small bore ducts, attenuate any noise which may be generated within the apparatus.

An additional advantage of the invention is that by virtue of the fact that the apparatus is provided with a fresh air inlet port through which fresh air is drawn, the apparatus is particularly suitable for use in moderate buildings which are relatively airtight, since the apparatus can be operated so that a predefined average volume of fresh air is introduced and mixed with the return air for delivery through the outlet ports as flow air for circulating through the respective zones, thereby ensuring that the respective zones are substantially continuously ventilated with fresh make-up air.

While the system and apparatus have been described for controlling the temperature in two and four zones, namely, two and four rooms, the system and apparatus may be used for controlling the temperature in any number of zones or rooms greater than or less than four. All that would be required if the system and apparatus is to control the temperature in more than four zones or rooms would be to provide a heat exchanger with the appropriate number of heat exchange zones in order to define the corresponding number of mutually isolated heat exchange paths. Needless to say, a similar number of mutually isolated bypass paths would be provided, as would a corresponding number of primary flaps.

While the system and apparatus have been described as comprising secondary valve means provided by secondary valve flaps, it is envisaged that in many cases, the secondary valve means may be dispensed with. The only disadvantage of dispensing with the secondary valve means is that the apparatus could not be selectively controlled to prevent controlling the temperature of one or more of the zones. It will of course be appreciated that where secondary valve means are provided any other suitable secondary valve means besides secondary air flaps may be used. It is also envisaged that where secondary valve means are provided, the secondary valve means may, if desired, be manually operable, instead of being controlled under the control of the microcontroller.

It is envisaged that other suitable primary valve means besides primary air flaps may be provided. While the heat exchanger has been described as being a coil heat exchanger, any other suitable heat exchanger may be provided, for example, an electric element.

Indeed, it is envisaged that the heat exchange means may be provided by a plurality of independent heat exchangers, rather than by a multi-zone heat exchanger. In which case, each heat exchanger would define a corresponding flow air heat exchange path, and the heat exchangers would be connected in parallel with each other across the boiler or chilling unit or both.

While the apparatus and system have been described for controlling temperature in the zones of a dwelling house, the apparatus and system may be used for controlling the temperature in zones or rooms of any other buildings, be they office buildings, industrial buildings, commercial buildings, entertainment buildings or the like.

While the flow and return ducts have been described as being of circular transverse cross-section, the flow and return ducts may be of any suitable or desired transverse cross-section. Additionally, while the flow and return ducts have been described as being of a particular transverse cross-sectional diameter, the flow and return ducts may be of other suitable transverse cross-sections, however, in general, it is envisaged that where the flow and return ducts are of circular transverse cross-section, it is unlikely that their respective diameters would be less than 50 mm, and likewise, it is unlikely that their respective diameters would be greater than 100 mm.

While the air circulating means has been described as being suitable for delivering the flow air through the flow ducts at specific air velocities, it is envisaged that the flow air may be delivered through the flow ducts at other suitable and desirable velocities, however, in general, unless the apparatus is being operated with the motor and air circulating means operating at the predefined low level speed, it is envisaged that the air circulating means will be operated to maintain the velocity of the flow air through the flow ducts at a velocity not less than 5M per second, and it is unlikely that the air circulating means would be operated to deliver the flow air through the flow air ducts at a velocity greater than 10M per second, since the power requirement to deliver the flow air through the flow air ducts at velocities greater than 10M per second would be relatively high. Similarly, the volume rates at which the flow air is delivered through the flow air ducts may be as low as $0.7M^3$ per minute, however, it is unlikely that the volume rate at which the flow air is delivered through the flow air ducts would exceed $1.0M^3$ per minute.

While the first, second and third predefined time periods have been described as being of specific values, it is envisaged that the first predefined time period may lie in the range of 2 minutes to 10 minutes, while the second predefined time period may lie in the range of 5 minutes to 15 minutes, and the third predefined time period may lie in the range of 2 minutes to 12 minutes.

The invention claimed is:
1. Apparatus for controlling temperature in a plurality of zones in a building, the apparatus comprising:
   a housing defining a hollow interior region and comprising:
   a plurality of inlet ports located in the housing and communicating with the hollow interior region of the housing, the inlet ports being adapted for connecting to respective return ducts communicating with the respective zones, and for receiving return air therethrough returned through the respective return ducts from the respective zones and for accommodating the return air to the hollow interior region,
   a plurality of outlet ports located in the housing and communicating with the hollow interior region of the housing, the outlet ports being adapted for connecting to respective flow ducts communicating with the respective zones, and for accommodating flow air therethrough from the hollow interior region for delivery through the flow ducts to the respective zones,
   an air circulating means located in the hollow interior region of the housing for circulating air through the hollow interior region from the inlet ports to the outlet ports,
   a heat exchange means located in the hollow interior region of the housing,
   a plurality of mutually isolated heat exchange paths formed in the hollow interior region of the housing extending through the heat exchange means and terminating in the respective outlet ports of the housing for accommodating the flow air therethrough from the air circulating means to the outlet ports,
   a plurality of mutually isolated bypass paths corresponding to the respective heat exchange paths and terminating in the respective outlet ports for accommodating the flow air from the air circulating means to the corresponding respective outlet ports with the flow air bypassing the corresponding ones of the heat exchange paths,
   a plurality of return air temperature sensing means located in the housing adjacent the respective inlet ports for sensing the temperature of the return air from the respective zones, and
   a plurality of primary valve means corresponding to the respective heat exchange paths, each primary valve means having only a single primary air flap located between the air circulating means and the heat exchange means adjacent the corresponding one of the heat exchange paths and the corresponding one of the bypass paths and being selectively operable in either one of a first state and a second state for selectively directing the flow air from the air circulating means to the corresponding one of the outlet ports through either the corresponding one of the heat exchange paths or the corresponding one of the bypass paths in response to the temperature of the return air from the corresponding one of the respective zones sensed by the corresponding return air temperature sensing means.

2. Apparatus as claimed in claim 1 in which the heat exchange means is located between the air circulating means and the outlet ports.

3. Apparatus as claimed in claim 1 in which the air circulating means is adapted for circulating the air through the apparatus so that the flow air passing through the outlet ports is suitable for delivery through respective small bore ducts of transverse cross-sectional diameter in the range of 50 mm to 100 mm.

4. Apparatus as claimed in claim 1 in which the air circulating means is adapted for circulating the air through the apparatus so that the flow air exiting the respective outlet ports exits at a rate in the range of $0.7M^3$ per minute to $1.0M^3$ per minute.

5. Apparatus as claimed in claim 1 in which a fresh air inlet port is provided for accommodating fresh air into the apparatus for mixing with the return air, the fresh air inlet port being located upstream of the circulating means, and a fresh air control valve means is provided for selectively controlling the supply of fresh air through the fresh air inlet port in response to the temperature sensing means.

6. Apparatus as claimed in claim 1 in which a plurality of secondary valve means is provided corresponding to the respective inlet ports, each secondary valve means being selectively operable in one of a communicating state for communicating the air circulating means with the corresponding inlet port and an isolating state for isolating the air circulating means from the corresponding inlet port.

7. Apparatus as claimed in claim 1 in which the heat exchange means is adapted for coupling to an energy source provided by one of heat source and a cooling source.

8. Apparatus as claimed in claim 7 in which the heat exchange means is adapted for receiving energy from the energy source via a heat exchange medium.

9. Apparatus as claimed in claim 1 in which a control means is provided for controlling the operation of the primary air flaps in response to the temperature of the return air from the respective zones.

10. Apparatus as claimed in claim 9 in which an input means is provided to the control means for facilitating inputting of respective temperature set point values indicative of the temperatures at which the air in the respective zones is to be maintained, and the control means is responsive to the temperature of the return air from each zone differing by a first predefined amount greater than the temperature set point value of the corresponding zone and by a predefined second amount less than the temperature set point value of the corresponding zone for operating the primary air flap corresponding to the zone for directing the flow air through an appropriate one of the heat exchange path and the bypass path corresponding to the zone.

11. Apparatus as claimed in claim 1 in which the the hollow interior region of the housing forms an impeller chamber for housing the air circulating means, a common inlet chamber communicating with the impeller chamber and the inlet ports and within which return air from the respective zones is mixed, and a heat exchange chamber for accommodating the heat exchange means downstream of the impeller chamber and communicating therewith, the heat exchange chamber communicating with the outlet ports.

12. A system for controlling temperature in a plurality of respective zones in a building, the system comprising:
   apparatus for controlling the temperature in the zones, the apparatus comprising:
   a housing defining a hollow interior region and comprising:
   a plurality of inlet ports located in the housing and communicating with the hollow interior region for receiving return air therethrough returned from the respective zones and for accommodating the return air to the hollow interior region,
   a plurality of outlet ports located in the housing and communicating with the hollow interior region of the housing for accommodating flow air therethrough from the hollow interior region for delivery to the respective zones, an air circulating means located in the hollow interior region of the housing for circulating air through the hollow interior region from the inlet ports to the outlet ports, a heat exchange means located in the hollow interior region of the housing, a plurality of mutually isolated heat exchange paths formed in the hollow interior region of the housing extending through the heat exchange means and terminating in the respective outlet ports of the housing for accommodating the flow air therethrough from the circulating means to the outlet ports, a plurality of mutually isolated bypass paths corresponding to the respective heat exchange paths and terminating in the respective outlet ports for accommodating the flow air from the air circulating means to the corresponding respective outlet ports with the flow air bypassing the corresponding ones of the heat exchange paths, a plurality of return air temperature sensing means located in the housing adjacent the respective inlet ports for sensing the temperature of the return air from the respective zones, and a plurality of primary valve means corresponding to the respective heat exchange paths, each primary valve means having only a single primary air flap located between the air circulating means and the heat exchange means adjacent the corresponding one of the heat exchange paths and the corresponding one of the bypass paths and being selectively operable in either one of a first state and a second state for selectively directing the flow air from the air circulating means to the corresponding one of the outlet ports through either the corresponding one of the heat exchange paths or the corresponding one of the bypass paths in response to the temperature of the return air from the corresponding one of the respective zones sensed by the corresponding return air temperature sensing means;

the system further comprising:

a plurality of flow ducts communicating the outlet ports with the respective zones, and a plurality of return ducts communicating the inlet ports with the respective zones.

13. A system as claimed in claim 12 in which each flow duct terminates at its downstream end in a venturi nozzle, each venturi nozzle defining an outlet orifice for accommodating the flow air therethrough, the transverse cross-sectional area of the orifice being at least 1900 mm².

14. A system as claimed in claim 13 in which each venturi nozzle is adapted for locating in a ceiling of the corresponding zone spaced apart from an adjacent wall of the zone a distance in the range of 100 mm to 250 mm for directing the flow air downwardly into the zone.

15. A system as claimed in claim 12 in which each return duct comprises an inlet adapted for receiving return air at a level in the zone lower than the level at which the flow air is delivered into the zone.

16. A system as claimed in claim 12 in which each flow duct is of diameter in the range of 50 mm to 100 mm, and each return duct is of diameter in the range of 50 mm to 100 mm.

17. A system as claimed in claim 12 in which the air circulating means is adapted for circulating the flow air through the respective flow ducts at a velocity in the range of 5M per second to 10M per second.

18. A system as claimed in claim 12 in which an energy source is provided, the energy source being coupled to the heat exchange means for providing one of heating and cooling to the heat exchange means.

19. A system as claimed in claim 18 in which the heat exchange means is adapted for receiving heating or cooling energy from the energy source via a heat exchange medium.

20. A method for controlling the temperature in a plurality of respective zones in a building, the method comprising:

providing apparatus for controlling the temperature in the respective zones, providing the apparatus with a housing defining a hollow interior region and comprising:

a plurality of inlet ports located in the housing and communicating with the hollow interior region for receiving return air therethrough returned from the respective zones and for accommodating the return air to the hollow interior region, a plurality of outlet ports located in the housing and communicating with the hollow interior region of the housing for accommodating flow air therethrough from the hollow interior region for delivery to the respective zones, locating an air circulating means in the hollow interior region of the housing for circulating air through the hollow interior region from the inlet ports to the outlet ports, locating a heat exchange means in the hollow interior region of the housing, providing a plurality of mutually isolated heat exchange paths formed in the hollow interior region of the housing extending through the heat exchange means and terminating in the respective outlet ports of the housing for accommodating the flow air therethrough from the circulating means to the outlet ports, providing a plurality of mutually isolated bypass paths corresponding to the respective heat exchange paths terminating in the respective outlet ports for accommodating the flow air from the circulating means to the corresponding respective outlet ports with the flow air bypassing the corresponding ones of the heat exchange paths, locating a plurality of return air temperature sensing means in the housing adjacent the respective inlet ports for sensing the temperature of the return air from the respective zones, providing a plurality of primary valve means corresponding to the respective heat exchange paths, each primary valve means having only a single primary air flap located between the air circulating means and the heat exchange means adjacent the corresponding one of the heat exchange paths and the corresponding one of the bypass paths and being selectively operable in either one of a first state and a second state for selectively directing the flow air from the air circulating means to the corresponding one of the outlet ports through either the corresponding one of the heat exchange paths or the corresponding one of the bypass paths in response to the temperature of the return air from the corresponding one of the respective zones sensed by the corresponding return air temperature sensing means, providing a plurality of flow ducts extending between the respective outlet ports and the respective corresponding zones, and providing a plurality of return ducts extending between the respective inlet ports and the respective corresponding zones;

the method further comprising:
operating the air circulating means to circulate air through the apparatus to and from the respective zones, and
operating each of the primary air flaps in response to the temperature of the return air from the corresponding zone to direct the flow air through either the heat exchange path or the bypass path corresponding to the zone for maintaining the temperature in the corresponding zone at the desired temperature.

* * * * *